United States Patent
Choi et al.

(10) Patent No.: US 11,321,132 B2
(45) Date of Patent: May 3, 2022

(54) EDGE COMPUTING METHOD AND APPARATUS FOR FLEXIBLY ALLOCATING COMPUTING RESOURCE

(71) Applicant: SAMSUNG SDS CO., LTD., Seoul (KR)

(72) Inventors: Hyo Keun Choi, Seoul (KR); Kyu Yull Yi, Seoul (KR); Jin Seon Lee, Seoul (KR); Su Hyun Kim, Seoul (KR); Suk Jeong Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 280 days.

(21) Appl. No.: 16/666,081

(22) Filed: Oct. 28, 2019

(65) Prior Publication Data

US 2021/0124617 A1 Apr. 29, 2021

(30) Foreign Application Priority Data

Oct. 25, 2019 (KR) ........................ 10-2019-0133990

(51) Int. Cl.
*G06F 9/50* (2006.01)
*G06F 9/54* (2006.01)
(Continued)

(52) U.S. Cl.
CPC .......... *G06F 9/5027* (2013.01); *G06F 9/5072* (2013.01); *G06F 9/542* (2013.01);
(Continued)

(58) Field of Classification Search
CPC ...... G06F 9/5027; G06F 9/5072; G06F 9/542; G06F 9/546; G06F 2209/508; G06N 20/00; G06K 9/6256
See application file for complete search history.

(56) References Cited

U.S. PATENT DOCUMENTS 10,637,142 B1* 4/2020 Tran ..................... H01Q 19/09
2018/0032908 A1* 2/2018 Nagaraju ............... G06F 11/30
(Continued)

FOREIGN PATENT DOCUMENTS

KR 10-2019-0106306 A 9/2019

OTHER PUBLICATIONS

Zhou et al. Distributing Deep Neural Networks with Containerized Partitions at the Edge, [online] (Jul. 9). USENIX., pp. 1-7. Retrieved From the Internet <https://www.usenix.org/system/files/hotedge19-paper-zhou.pdf> (Year: 2019).*

*Primary Examiner* — Emerson C Puente
*Assistant Examiner* — Jonathan R Labud
(74) *Attorney, Agent, or Firm* — The PL Law Group, PLLC

(57) ABSTRACT

An edge computing method for flexibly allocating a computing resource includes receiving an edge module and a container resource allocation value, generating a container based on the container resource allocation value and arranging the edge module in the generated container. The edge module is distributed to an edge computing device to perform a predetermined data processing. The container is a software component of the edge computing device providing an isolated computing environment for driving the edge module. The edge computing device is installed on-premise. The edge computing device can flexibly adjust available computing resources according to the current working situation and a resource requirement. In response to an environment, in which data traffic is flexible according to time or situation, such as a manufacturing plant, allocated resources of the edge computing device can be quickly adjusted, thereby a stable service can be provided.

12 Claims, 17 Drawing Sheets

(51) Int. Cl.
    *G06N 20/00*     (2019.01)
    *G06K 9/62*     (2022.01)

(52) U.S. Cl.
    CPC ........... *G06F 9/546* (2013.01); *G06K 9/6256* (2013.01); *G06N 20/00* (2019.01); *G06F 2209/508* (2013.01)

(56) References Cited

U.S. PATENT DOCUMENTS

2019/0050683 A1\*   2/2019   Gupta Hyde ....... H04L 63/0421
2020/0218937 A1\*   7/2020   Visentini Scarzanella ..................
                                          G06N 3/0472

\* cited by examiner

EDGE COMPUTING METHOD AND APPARATUS FOR FLEXIBLY ALLOCATING COMPUTING RESOURCE

CROSS REFERENCE TO RELATED APPLICATIONS AND CLAIM OF PRIORITY

This application claims the benefit of Korean Patent Application No. 10-2019-0133990 filed on Oct. 25, 2019 in the Korean Intellectual Property Office, the disclosure of which is incorporated herein by reference in its entirety.

FIELD

The present disclosure relates to an edge computing method and system. More specifically, the present disclosure relates to an edge computing method and system for flexibly allocating a computing resource considering changes in data processing requirement over time.

DESCRIPTION OF THE RELATED ART

Cloud computing is a computing method, in which data is processed and analyzed by a central server called a cloud server, and the result is presented to a user through a wireless network. Such cloud computing is rapidly being utilized in that a high-performance cloud server can be easily accessed and used anywhere. However, such cloud computing also has problems, such as increased latency due to non-proximity between a cloud and a user, increased communication costs incurred by transmitting large amounts of data to the cloud, and not providing location-awareness.

Edge computing is a concept created to solve the problems of cloud computing. Edge computing is a technology that performs data processing and analysis directly at an edge device or a gateway closest to a data source, unlike a traditional cloud computer. Recently, efforts to extend edge computing to a manufacturing plant, such as a factory or a production site, have been tried.

However, unlike cloud computing, which can be scaled out according to the need for instantaneous computing resources, edge computing installed on-premised in a manufacturing plant has a difficulty to flexibly increase the available computing resources in response to the situation of temporarily requiring a lot of computing resources. Further, although data traffic is flexibly generated in a manufacturing plant according to process planning, time (seasonal, monthly, daily, etc.) or situation, on-premised edge computing cannot adapt quickly to these changes, and thus cannot provide stable service.

SUMMARY

An embodiment of the present disclosure is to provide an edge computing method and system for flexibly adjusting available computing resources according to a computing resource requirement.

Another embodiment of the present disclosure is to provide an edge computing method and system that can provide a stable service by quickly responding to an environment, in which data traffic is flexible according to time or a situation, such as a manufacturing plant.

The present disclosure is not limited to the above-mentioned embodiments, and other embodiments not mentioned above may be clearly understood by those skilled in the art from the following description.

According to aspects of the present disclosure, there is provided an edge computing method for flexibly allocating a computing resource. The method comprises receiving an edge module and a container resource allocation value, generating a container based on the container resource allocation value, and arranging the edge module in the generated container, wherein the edge module is a module distributed to an edge computing device and configured to perform a predetermined data processing operation, wherein the container is a software component of the edge computing device that provides an isolated computing environment for driving the edge module, wherein the edge computing device is a computing device installed on-premise.

According to another aspects of the present disclosure, there is provided an edge computing method for flexibly allocating a computing resource, which comprises collecting resource usage of an edge module, determining whether a resource allocated to a container, in which the edge module is arranged, is insufficient by referring to the resource usage of the edge module, calculating a required resource amount of the edge module by referring to the resource usage of the edge module according to the determination result, and calculating a resource allocation value of the container based on the required resource amount of the edge module, wherein the edge module is a module distributed to an edge computing device and configured to perform a predetermined data processing operation, wherein the container is a software component of the edge computing device that provides an isolated computing environment for driving the edge module, wherein the edge computing device is a computing device installed on-premise.

According to aspects of the present disclosure, there is provided an edge computing system for flexibly allocating a computing resource. The system comprises a processor, a memory for loading a computer program executed by the processor, and a storage for storing the computer program, wherein the computer program includes instructions to perform operations including receiving an edge module and a container resource allocation value, generating a container based on the container resource allocation value, and arranging the edge module in the generated container, wherein the edge module is a module distributed to an edge computing device and configured to perform a predetermined data processing operation, wherein the container is a software component of the edge computing device that provides an isolated computing environment for driving the edge module, wherein the edge computing device is a computing device installed on-premise.

According to aspects of the present disclosure described above, an edge computing device installed in an on-premised form in a manufacturing plant can flexibly adjust available computing resources according to the current working situation and a resource requirement.

Further, in response to an environment, in which data traffic is flexible according to time or situation, such as a manufacturing plant, allocated resources of the edge computing device can be quickly adjusted, thereby a stable service can be provided.

The present disclosure is not limited to the above-mentioned embodiments, and other embodiments not mentioned above may be clearly understood by those skilled in the art from the following description.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
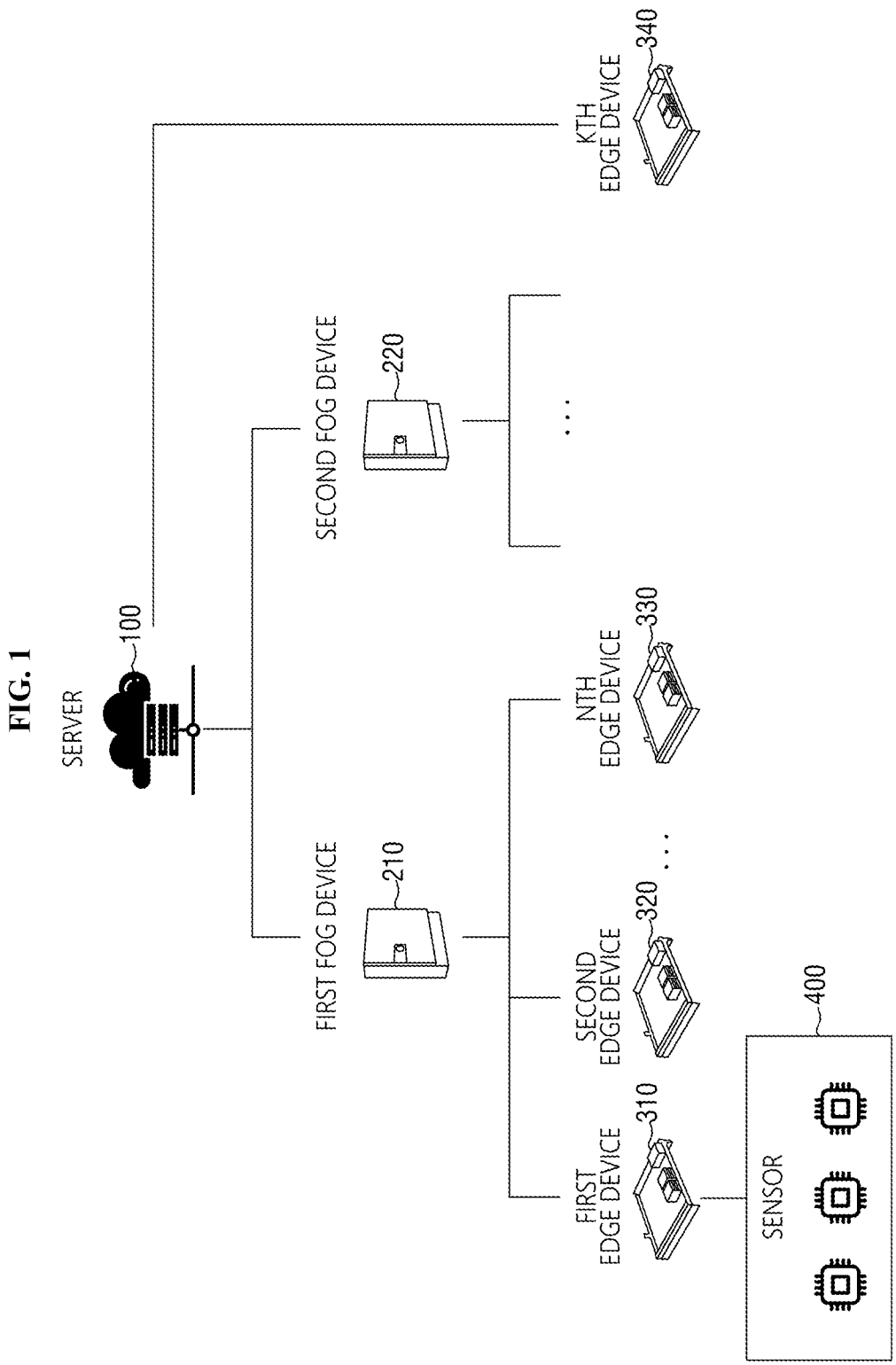
FIG. 1 is a conceptual diagram illustrating an edge computing system 1000 according to some embodiments of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

In adding reference numerals to components of each drawing, the same components may have the same reference numeral as possible even if they are displayed on different drawings. Further, in describing the present disclosure, a detailed description of related known configurations and functions will be omitted when it is determined that it may obscure the gist of the present disclosure.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

In describing components of the present disclosure, it is possible to use the terms such as first, second, A, B, (a), (b), etc. These terms are only intended to distinguish a component from another component, and a nature, an order, or a sequence is not limited by that term. When a component is described as being "connected," "coupled" or "connected" to another component, the component may be directly connected or able to be connected to the other component; however, it is also to be understood that an additional component may be "interposed" between the two components, or the two components may be "connected," "coupled" or "connected" through an additional component.

It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Hereinafter, various embodiments of the present disclosure for solving the above-described technical problems will be described.

FIG. 1 is a conceptual diagram illustrating an edge computing system 1000 according to some embodiments of the present disclosure. Referring to FIG. 1, the edge computing system 1000 includes a server 100, a plurality of fog devices 210 and 220, and a plurality of edge devices 310, 320, 330 and 340.

The server 100 is a central server performing data communication through a plurality of fog devices 210 and 220 or with the edge device 340, and may be a cloud server. The server 100 having a high-performance processor and hardware may process a plurality of tasks that are difficult to be processed by the plurality of fog devices 210 and 220 or the plurality of edge devices 310, 320, 330 and 340, and provide its result to the fog devices 210 and 220 or the plurality of edge devices 310, 320, 330 and 340. Specific configurations and functions of the server 100 will be described later with reference to FIGS. 3 to 17, and thus the detailed description thereof is omitted here.

The plurality of fog devices 210 and 220 relay the server 100 and the edge devices 310, 320 and 330, monitor the working status of the edge devices 310, 320 and 330 and manage their edge computing. The plurality of fog devices 210 and 220 may be connected to one or more edge devices, respectively, and may function as an upper device of the edge devices connected to them. Specific configurations and functions of the plurality of fog devices 210 and 220 will be described later with reference to FIGS. 3 to 17, and thus the detailed description thereof is omitted here.

The plurality of edge devices 310, 320, 330 and 340 are devices that perform edge computing, and refer to computing devices installed in or between facilities in a manufacturing plant. The plurality of edge devices 310, 320, 330 and 340 may be devices that are connected to sensors 400 and receive sensor data therefrom, such as a first edge device 310. Meanwhile, the plurality of edge devices 310, 320, 330 and 340 may be devices managed and controlled by the specific fog device 210, such as a first, second and Nth edge devices, or devices may be directly managed and controlled by the server 100 without another fog device in between such as a Kth edge device. Specific configurations and functions of the plurality of edge devices 310, 320, 330 and 340 will be described later with reference to FIGS. 3 to 17, and thus the detailed description thereof is omitted here.

In general, since an edge computing device installed on-premised in a manufacturing plant, such as a factory, is attached to a facility itself performing process, or is installed between facilities, it is difficult to flexibly change hardware resources of the device once the edge computing device is installed. It is contrasted with the fact that the cloud service can easily respond to the required resource amount by automatically scaling-out/scaling-in computing resources allocated to a corresponding task when the usage of a CPU or a memory increases.

The present disclosure configures a container that can perform computing tasks independently of each edge device 310, 320, 330 and 340, and arranges a working module (hereinafter, referred to as 'edge module') that performs actual work of the edge devices 310, 320, 330 and 340 in the container to provide an edge computing device with a flexible computing resource allocation function similar to a cloud service. At this time, the edge module and the container are not fixedly installed and arranged in a specific edge device, and are flexibly distributed and installed in the most suitable edge device among a plurality of edge devices according to the current working situation and resource requirements.

Figure 2:
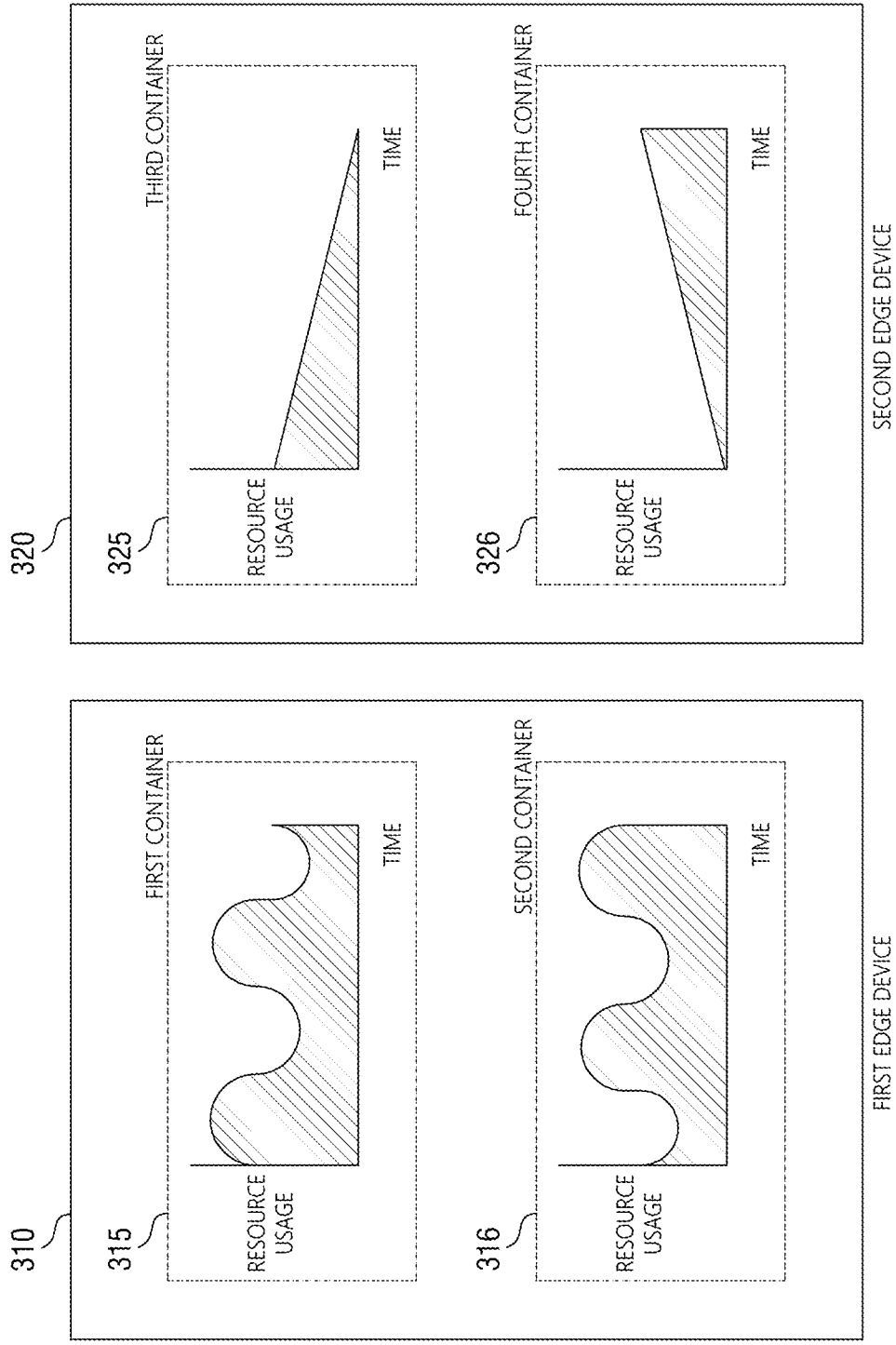
FIG. 2 is a diagram for describing a concept of a container driven by edge devices 310, 320, 330 and 340 and an edge module shown in FIG. 1, and a relationship between them.

FIG. 2 is a diagram for describing a concept of a container and an edge module driven by the edge devices 310, 320, 330 and 340 shown in FIG. 1 and a relationship between them. Referring to FIG. 2, an example of the containers 315, 316, 325 and 326 installed and arranged in a first edge device 310 and a second edge device 320 are shown. For convenience of description, a graph of resource-usage over time of an edge module operating inside each of the containers 315, 316, 325 and 326 is shown in each of the containers 315, 316, 325 and 326.

In FIG. 2, each edge device 310, 320 is illustrated as being capable of including a plurality of containers. For example, the first edge device 310 includes a first container 315 and a second container 316, and the second edge device 320 includes a third container 325 and a fourth container 326. In this case, each container 315, 316, 325 and 326 is not a fixed hardware configuration, but a computing element that is driven by allocating appropriate computing resources as needed, such as a virtual machine.

Meanwhile, in the present disclosure, an edge module refers to a module that is distributed to an edge computing device and configured to perform a predetermined data processing operation, and a container is a software element of an edge computing device that provides an isolated computing environment for driving the edge module. And, the edge computing device refers to a computing device installed in an on-premised manner.

Each container (315, 316, 325, 326) is allocated a computing resource of a size suitable for the resource usage of the edge module arranged therein, and can run its own edge module independently of other containers, and thus is not interrupted by an operation or a version of other containers.

Each edge device 310, 320 may configure containers 315, 316, 325 and 326 considering the resource requirements of an edge module and may be assigned an edge module. For example, as illustrated in FIG. 2, two containers 315 and 316 of the first edge device 310 may be assigned edge modules having a time-resource usage graph complementary to each other. That is, edge modules, of which relation is that when the edge module of the first container 315 uses a lot of resources, the edge module of the second container 316 uses less resources, and conversely, when the edge module of the first container 315 uses less resources, the edge module of the second container 315 uses a lot of resources, may be allocated to the containers 315 and 316 of the first edge device 310. This is to maximize the usage efficiency of the computing hardware of the first edge device 310. Similarly, two containers 325 and 326 of the second edge device 320 also may be assigned edge modules, respectively, having a time-resource usage graph complementary to each other.

Meanwhile, the present disclosure basically assumes that one edge module is arranged in one container. This is to avoid collision with each other when the edge modules are driven. However, since this is only one embodiment, the scope of the present disclosure is not limited thereto. In some cases, a plurality of edge modules may be arranged in one container.

Referring back to FIG. 1, in order to provide the above-described flexible computing resource allocation function to an edge computing device, the edge computing system 1000 uses the central server 100 and the intermediate fog devices 210 and 220 to calculate current resource usage and future resource requirements of the edge devices 310, 320, 330 and 340, distributes edge modules to each of the edge devices 310, 320, 330 and 340, and provides a resource allocation value of a container, in which an edge module will be driven, in a way that computing resources can be the most efficiently utilized. Through this process, each of the edge devices 310, 320, 330 and 340 can actively adjust the resources allocated to the container based on the resource amount required by the edge module, thereby the computing resources of the edge computing system 100 can be effectively distributed and stable service can be provided.

Meanwhile, a detailed method of driving the edge computing system 1000 will be described in FIGS. 3 to 17. With reference to FIGS. 3 to 17, for simplicity of description, it will be described mainly focusing on the relationship between the server 100, the first fog device 210 and the first edge device 310, and their operations. Meanwhile, when the performing subject of each step is not specified below, it is assumed that the subject is the edge computing system 100 of FIG. 1.

Figure 3:
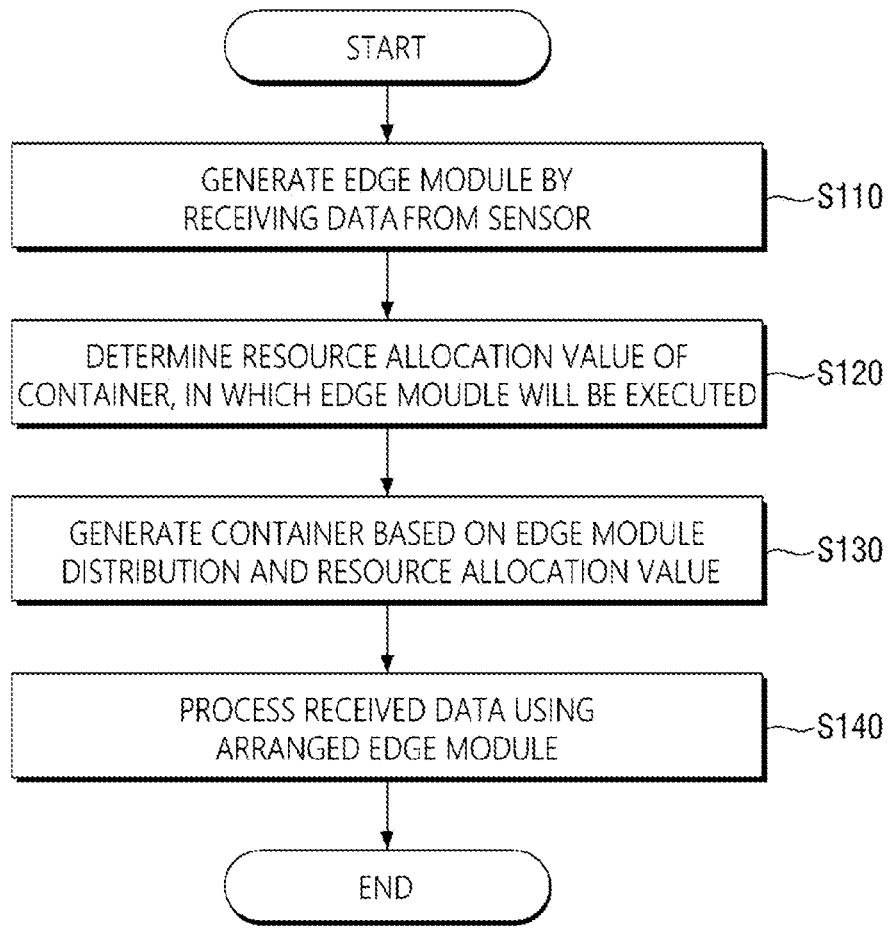
FIG. 3 is a flowchart illustrating an operating method of an edge computing system 1000 shown in FIG. 1.

FIG. 3 is a flowchart illustrating an edge computing method based on the edge computing system 1000 shown in FIG. 1. Referring to FIG. 3, the edge computing method is composed of four steps of steps S110 to S140.

At step S110, the edge computing system 1000 receives data from a sensor and generates an edge module based on the received data. For a clear understanding of step S110, it will be further described with reference to FIGS. 4 and 5.

Figure 4:
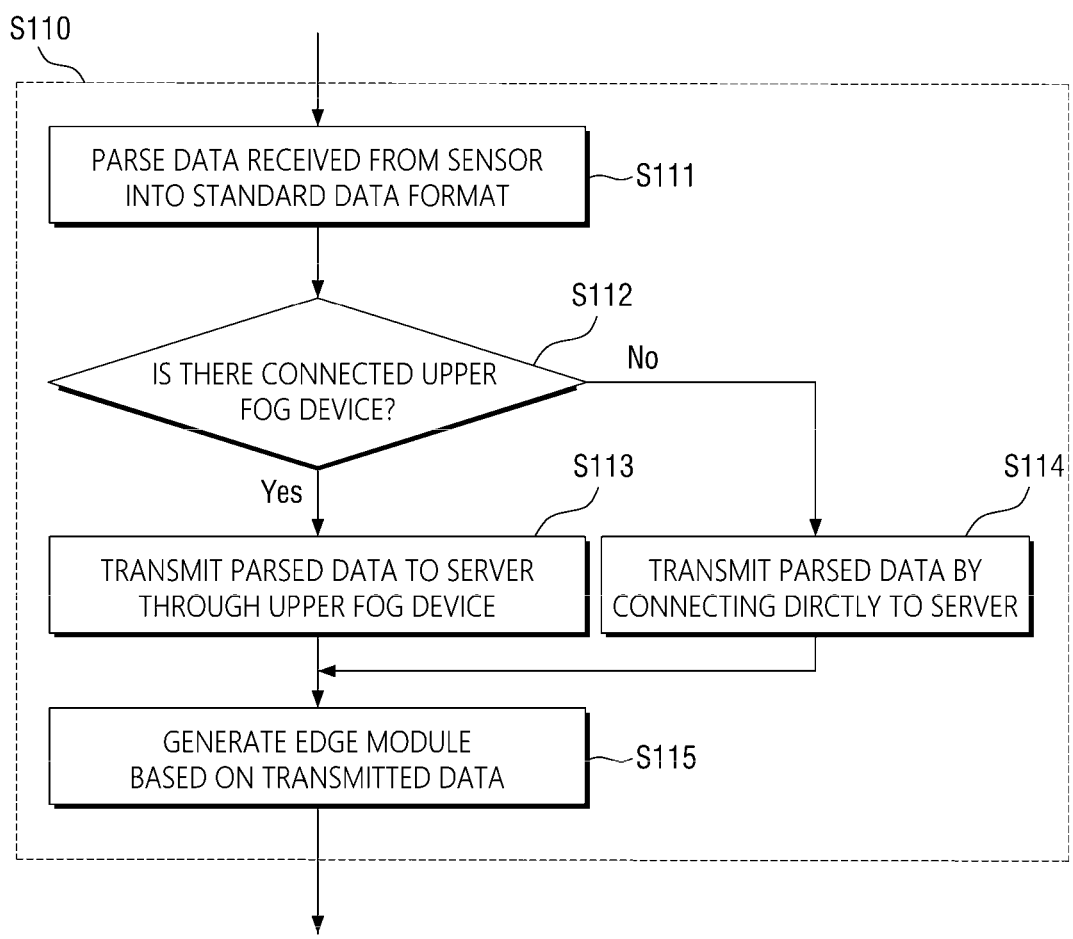
FIG. 4 is a flowchart illustrating a specific embodiment of step S110 of generating an edge module shown in FIG. 3.
Figure 5:
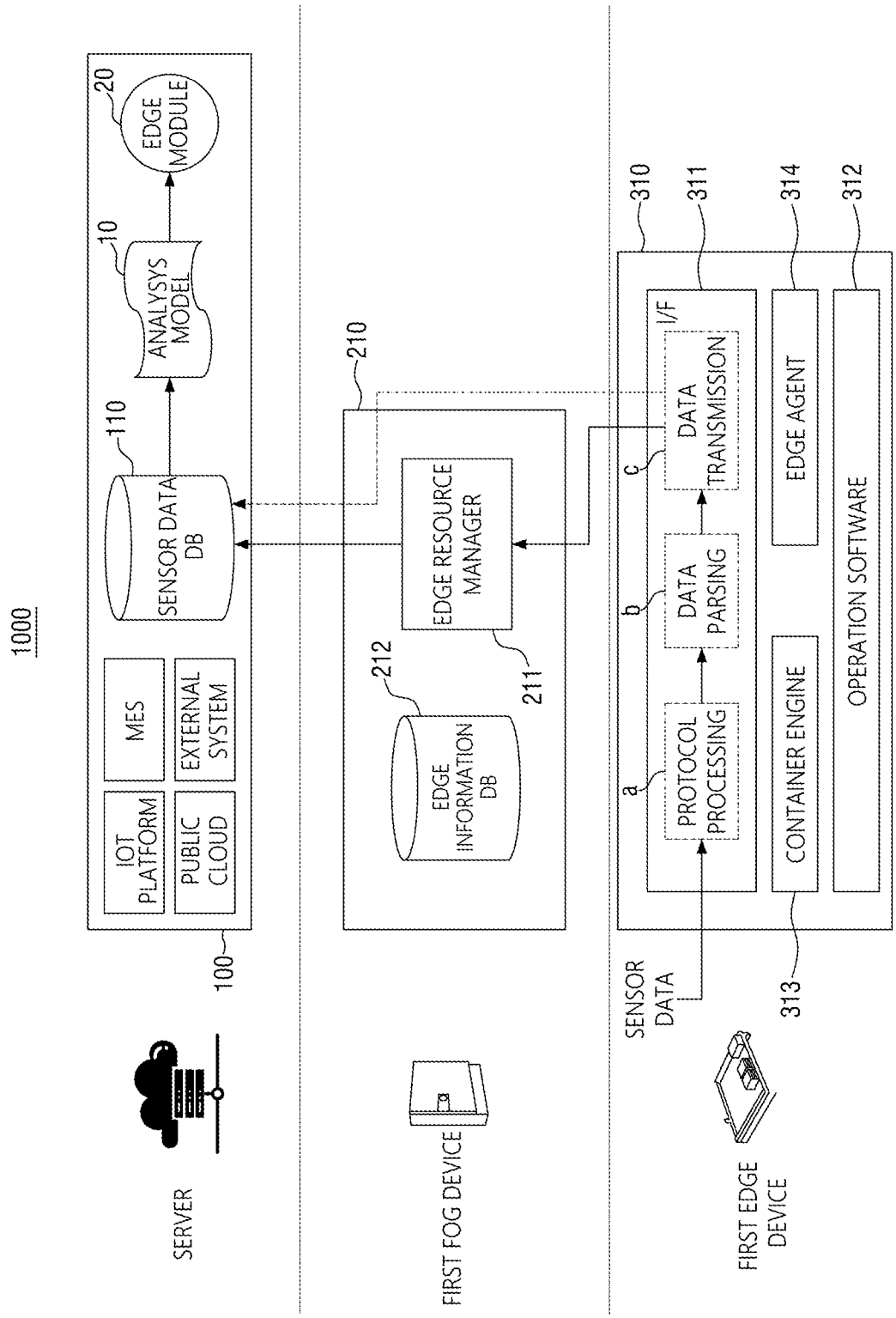
FIG. 5 is a diagram illustrating a specific embodiment of generating an edge module described with reference to FIG. 4.

FIG. 4 is a flowchart illustrating a specific embodiment of step S110 of generating the edge module of FIG. 3. FIG. 5 is a diagram illustrating a method for driving the method of generating an edge module, described with reference to FIG. 4, on the system. In embodiments of FIGS. 4 and 5, a series of steps of generating an edge module, in which the first edge device 310 receives data from a sensor and transmits the data to the server 100, and the server 100 generates an analysis model based on the transmitted data, will be described.

First, at step S111, the first edge device 310 parses data received from a sensor into a standard data format. Referring to FIG. 5, a series of steps, in which sensor data is input to an interface (I/F) 311 of the first edge device, a communication protocol of data received in the interface 311 is interpreted (a), the interpreted data is parsed into a standard data format (b) and transmitted to the outside (c), are performed.

At step S112, the first edge device 310 determines whether there is an upper fog device connected thereto. If the upper fog device exists, the present embodiment proceeds to step S113 to transmit the parsed data to the upper fog device 210. The upper fog device 210 transmits it to the server 100 again. In this case, the upper fog device 210 may store the received data in its edge information DB 212 and transmit the data stored in the edge information DB 212 to the server 100 in a batch according to a predetermined period. On the other hand, if the upper fog device does not exist, the present embodiment proceeds to step S114 and the first edge device 310 attempts to connect directly to the server 100 and directly transmits the parsed data to the server 100 after connecting to the server 100. Referring to FIG. 5, since there is an upper fog device 210 connected to the first edge device 310, an example that the first edge device 310 transmits the parsed data through the first fog device 210 to the server 100 is shown by the solid line. However, if there is no upper fog device of the first edge device 310, the parsed data may be directly transmitted to the server 100 as shown in the dotted line of FIG. 5.

At step S115, the server 100 generates an edge module based on the transmitted sensor data. At this time, the server 100 may be an IOT platform server, an MES server, a public cloud server, an external system server, or a combination thereof as shown in FIG. 5. Meanwhile, a container engine 313 (or a docker) shown in FIG. 5 refers to software for automating the arrangement of the edge module in the container.

Referring to FIG. 5 again, the server 100 receives the transmitted sensor data and stores it in the sensor data DB 110. And, an edge analysis model 10 is generated based on the data stored in the sensor data DB 110, and an edge module to perform the necessary work in the first edge device 310 is generated through the generated analysis model 10. In this case, the server 100 may learn the data stored in the sensor data DB 110 through a machine learning-based artificial intelligence model, and based on this, generate an edge analysis model suitable for analyzing or processing the received sensor data 110. Hereinafter, a detailed description thereof will continue with reference to FIGS. 6 and 7.

Figure 6:
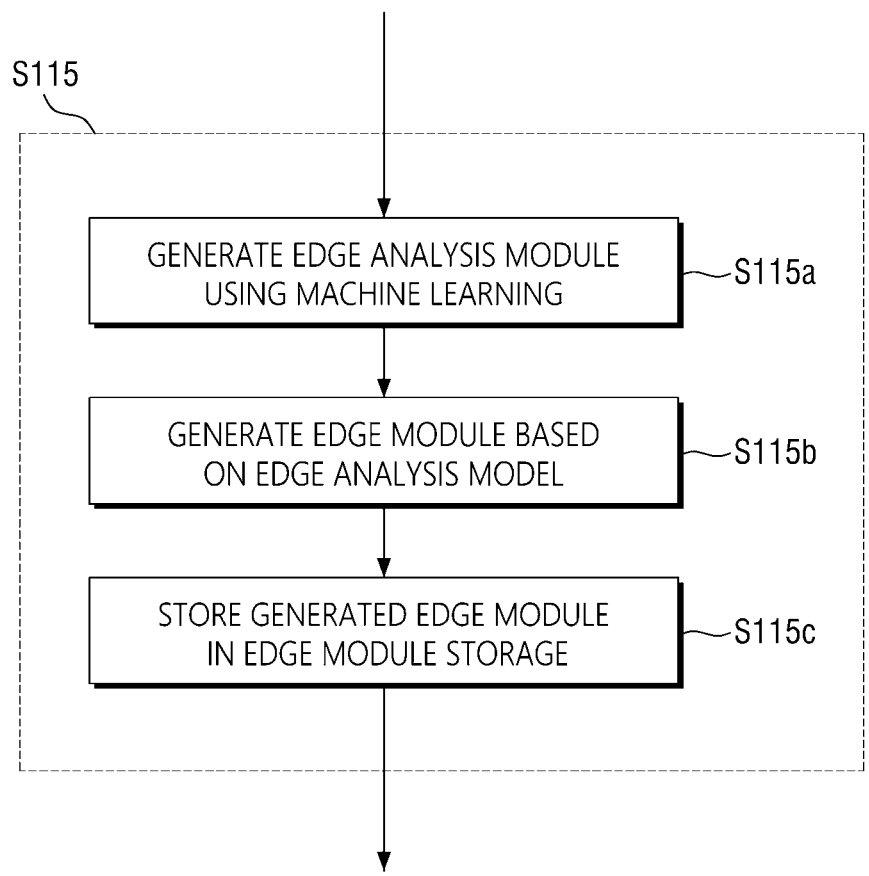
FIG. 6 is a flowchart illustrating an embodiment of further specifying step S115 shown in FIG. 4.
Figure 7:
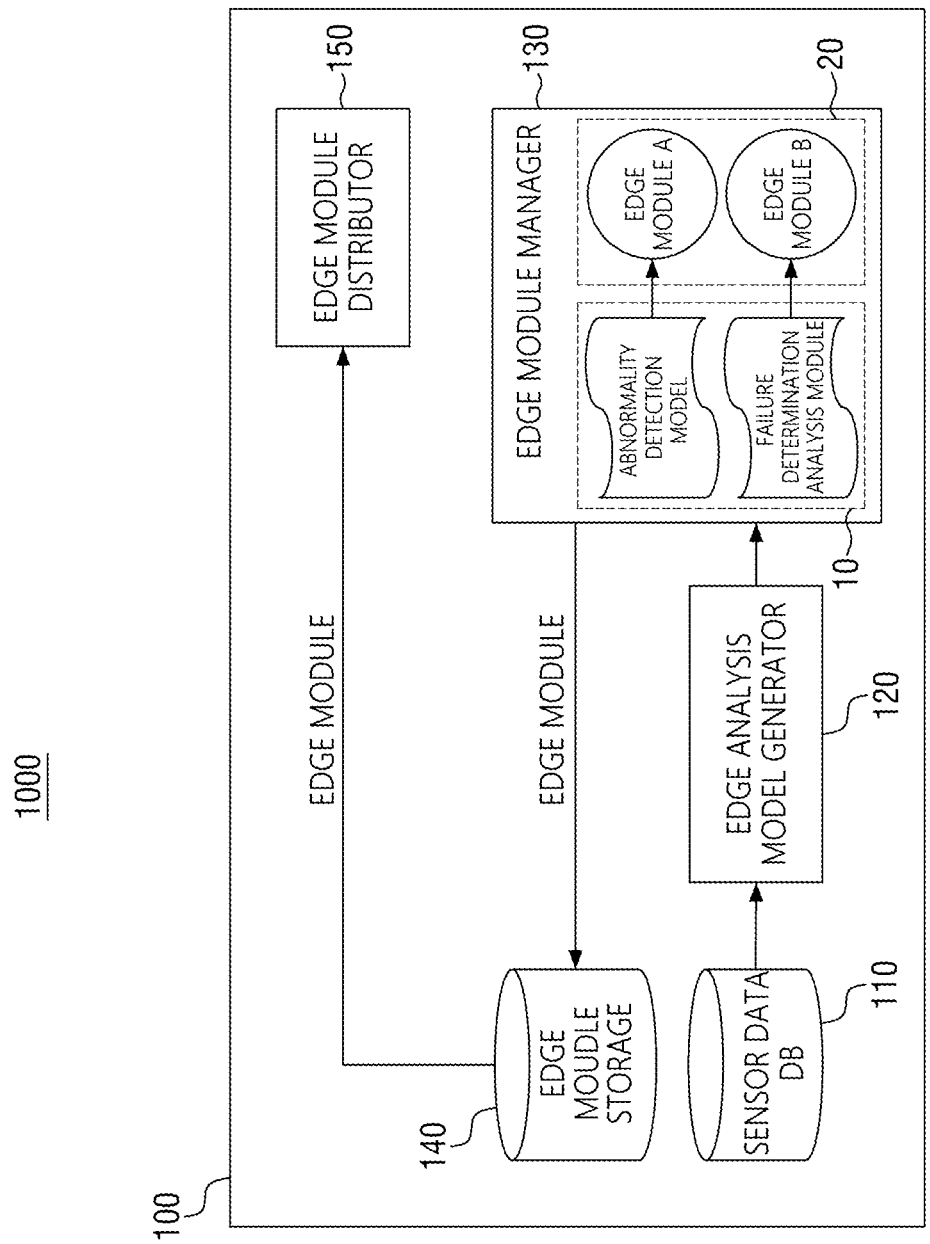
FIG. 7 is a diagram illustrating a specific embodiment of generating an edge module based on machine learning described with reference to FIG. 6.

FIG. 6 is a flowchart illustrating an embodiment, in which step S115 illustrated in FIG. 4 is further embodied. FIG. 7 is a diagram illustrating a specific embodiment of generating an edge module based on machine learning through the method described in FIG. 6.

First, referring to FIG. 6, at step S115a, the server 100 generates an edge analysis model using machine learning by using the sensor data DB 110 through the edge analysis model generator 120. Specifically, the server 100 learns data accumulated in the sensor data DB 110 using the edge analysis model generator 120, which is an AI model based on machine learning. As a result of the learning, an analysis model 10 trained to analyze or process data for a specific purpose is generated. The generated analysis model 10 is provided to the edge module manager 130.

As an embodiment, the edge analysis model generator 120 may generate various analysis models according to its purpose. For example, the edge analysis model generator 120 may generate an abnormality detection analysis model for detecting an abnormal operation of a specific device or sensor or a failure determination analysis model for determining a failure of a specific device or sensor.

At step S115b, the server 100 generates an edge module based on the generated edge analysis model. Specifically, the server 100 processes the analysis model 10 provided by the edge analysis model generator 120 as an edge module 20 to be distributed to individual edge devices using the edge module manager 130. For example, the edge module manager 130 may generate the edge module 20 by tuning the provided analysis model 10 to an interface of the first edge device 310, or manage the provided analysis model 10 itself as the edge module 20.

At step S115c, the server 100 stores the generated edge module in an edge module storage 140. The edge module storage 140 is a storage that stores modules modularized in advance in order to immediately distribute and apply the edge modules when needed. When the server 100 distributes an edge module, the edge modules stored in the edge module storage 140 are searched and distributed.

Figure 8:
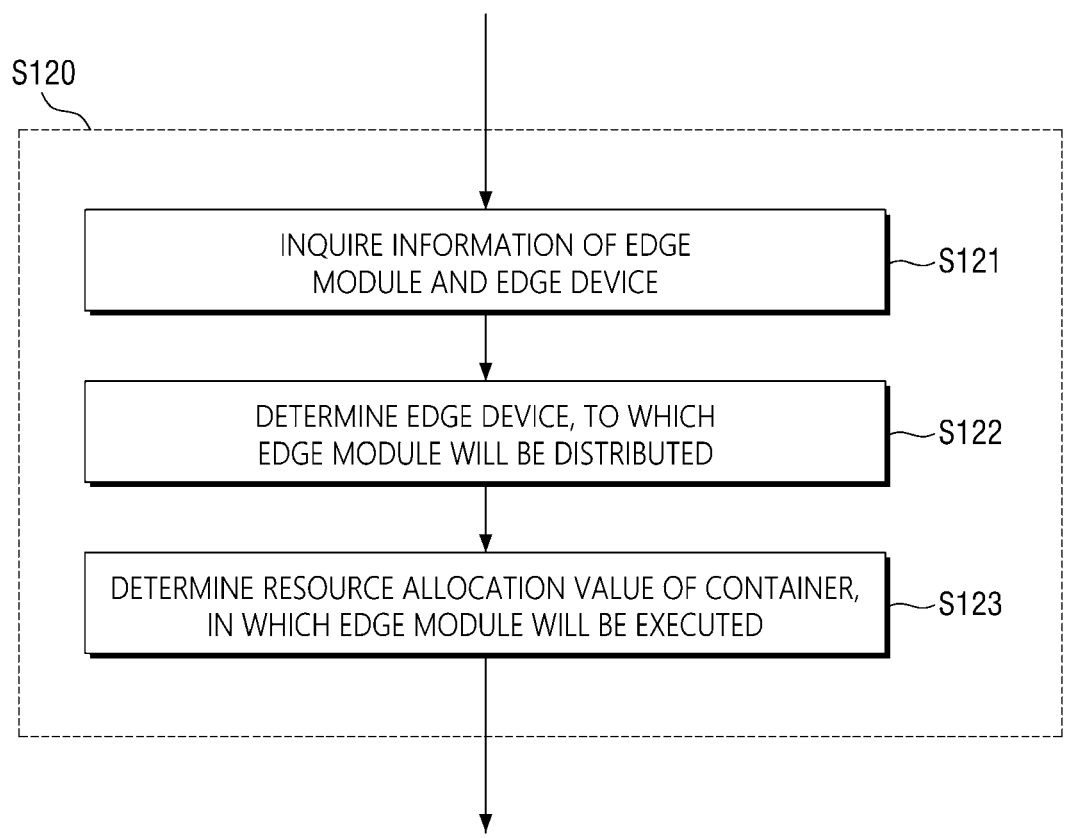
FIG. 8 is a flowchart illustrating a specific embodiment of step S120 of determining a container resource allocation value shown in FIG. 3.

Referring back to FIG. 3, at step S120, the edge computing system 1000 determines a resource allocation value of a container, in which the edge module will be executed, based on the characteristics of the edge module and a process plan of a manufacturing plant. Hereinafter, a detailed description thereof will be continued with reference to FIG. 8. FIG. 8 is a flowchart illustrating a specific embodiment of step S120 of determining a container resource allocation value as shown in FIG. 3.

Referring to FIG. 8, at step S121, the server 100 inquires information of an edge module and edge devices. In this case, the inquired information may include distribution status of each edge module (that is, which edge modules are distributed to which edge device) or resource usage information of each edge device and edge modules.

At step S122, the server 100 determines which edge modules to be distributed to each edge device, and an edge device, to which the edge module is distributed. In this case, the server 100, based on the information of the edge module and the edge devices inquired above, may determine an edge device, to which the edge module is distributed, such that the sum of the resource usage of the edge modules distributed for each edge device does not exceed the computing resource amount of the corresponding edge device, and overall resource utilization rates of the edge devices after distributing the edge module are similar to each other.

At step S123, the server 100 determines a resource allocation value of a container, in which an edge module will be executed, for an edge device, to which an edge module is distributed. In this case, the server 100 may calculate an expected required resource amount of an edge module based on the characteristics of the edge module to be distributed and a process plan of a manufacturing plant, and determine a resource allocation value of the container accordingly. In an embodiment, the determined resource allocation value may be a value indicating a CPU allocation amount or a memory allocation amount to be allocated to the container.

Figure 9:
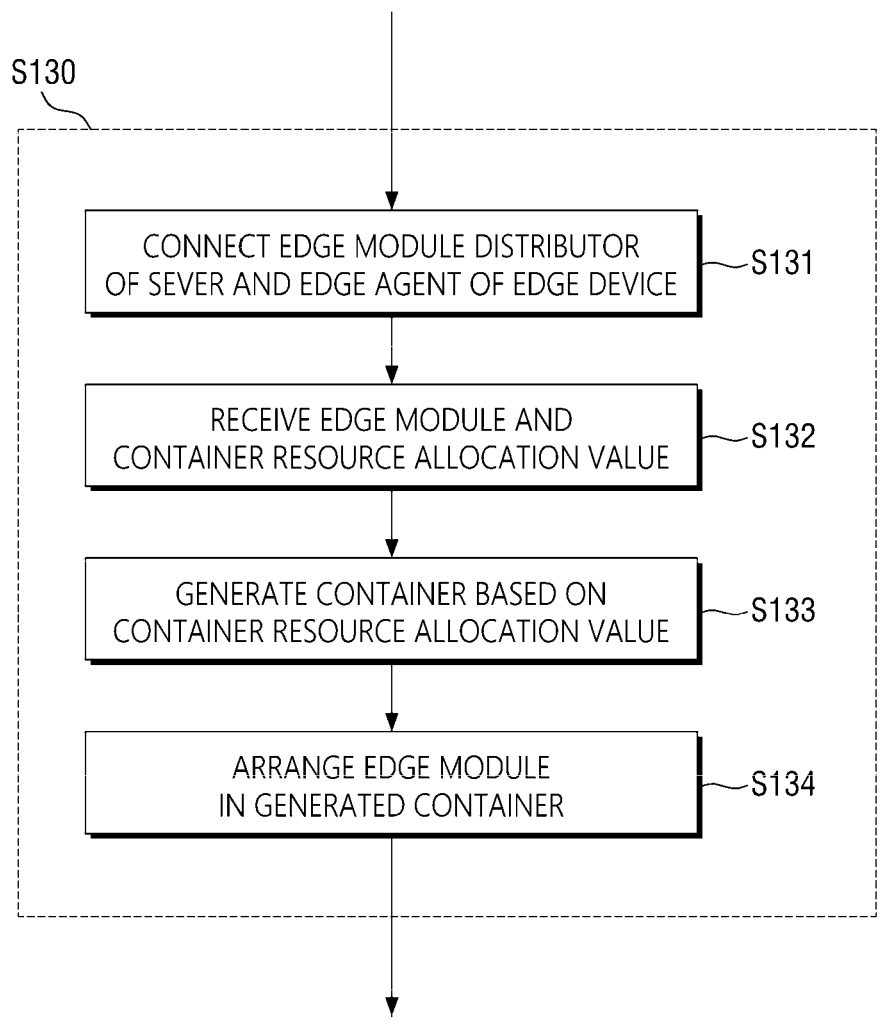
FIG. 9 is a flowchart illustrating a specific embodiment of step S130 of generating a container and arranging an edge module shown in FIG. 3.

Referring back to FIG. 3, at step S130, the edge computing system 1000 distributes an edge module to the first edge device 310 and generates a container based on the determined resource allocation value. The distributed edge module is arranged in the generated container. Hereinafter, a detailed description thereof will be continued with reference to FIG. 9. FIG. 9 is a flowchart illustrating a specific embodiment of step S130 of generating a container and arranging an edge module shown in FIG. 3.

Referring to FIG. 9, at step S131, the first edge device 310 communicates with the server 100 to connect an edge module distributor 150 of the server 100 and the edge agent 314 of the first edge device 310. In this case, the edge module distributor 150 and the edge agent 314 may be connected through a secure channel for confidentiality.

At step S132, the edge agent 314 of the first edge device 310 receives an edge module distributed to itself from the edge module distributor 150. In this case, the edge agent 314 may receive the container resource allocation value determined by the server 100 at step S120.

At step S133, the edge agent 314 generates a container based on the received container resource allocation value.

At step S134, the edge agent 314 arranges the distributed edge module in the generated container.

Figure 10:
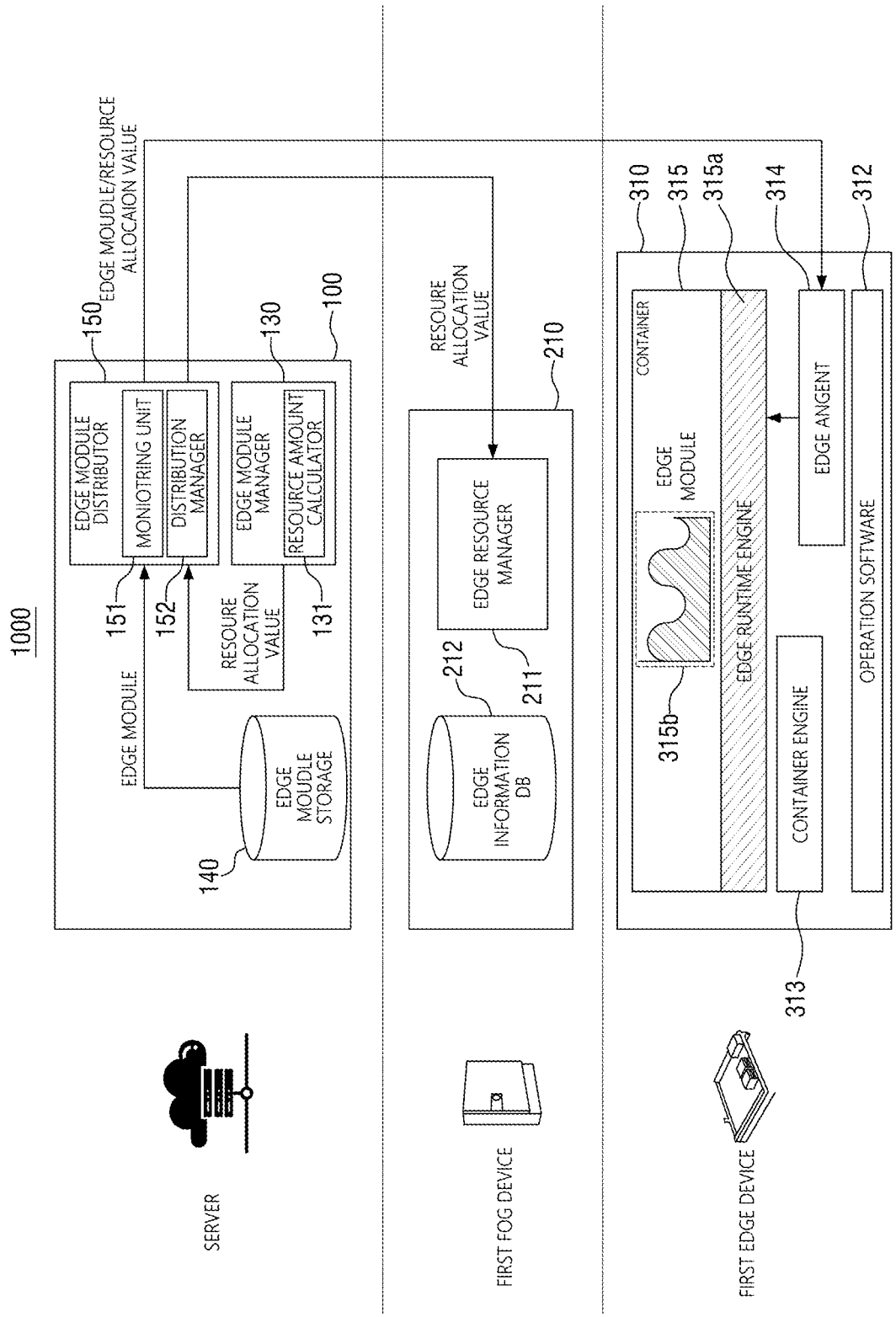
FIG. 10 is a diagram illustrating a specific embodiment of determining a resource allocation value of a container, and accordingly arranging an edge module after generating a container described with reference to FIGS. 8 and 9.

For more clear understanding of the steps S120 and S130, it will be further described with reference to FIG. 10. FIG. 10 is a diagram for illustrating a specific embodiment of determining a resource allocation value of a container and arranging an edge module after generating the container accordingly described with reference to FIGS. 8 and 9.

Referring to FIG. 10, the server 100 includes an edge module distributor 150 for monitoring edge devices and edge modules distributed thereto, and distributing edge modules to edge devices.

First, the server 100 determines a resource allocation value of a container, in which edge modules to be distributed will be executed, by using a resource amount calculator 131 included in an edge module manager 130. In this case, the resource amount calculator 131 may calculate an expected required resource amount of the edge module based on the characteristics of the distributed edge module and a process plan of a manufacturing plant, and then determine the resource allocation value of the container accordingly. In an embodiment, the determined resource allocation value may be a value indicating a CPU allocation amount or a memory allocation amount to be allocated to the container.

Next, the server 100 loads the edge module to be distributed from the edge module storage 140 through the edge module distributor 150, and then transmits the edge module to the edge agent of the first edge device 310 through the distribution manager 152. In this case, the server 100 may receive the determined resource allocation value of the container from the edge module manager 130 and transmit it to the edge agent 314 simultaneously or sequentially.

The edge agent 314 receives the edge module and the resource allocation value from the edge module distributor 150 and provides information on the edge module and the resource allocation value of the container to the edge runtime engine 315a. The edge runtime engine 315a generates a container by allocating computing resources of the first edge device 310 according to the provided information about the edge module and the resource allocation value of the container. And, the edge runtime engine 315a uses the container engine 313 to arrange the edge module 315b in the container 315.

Figure 11:
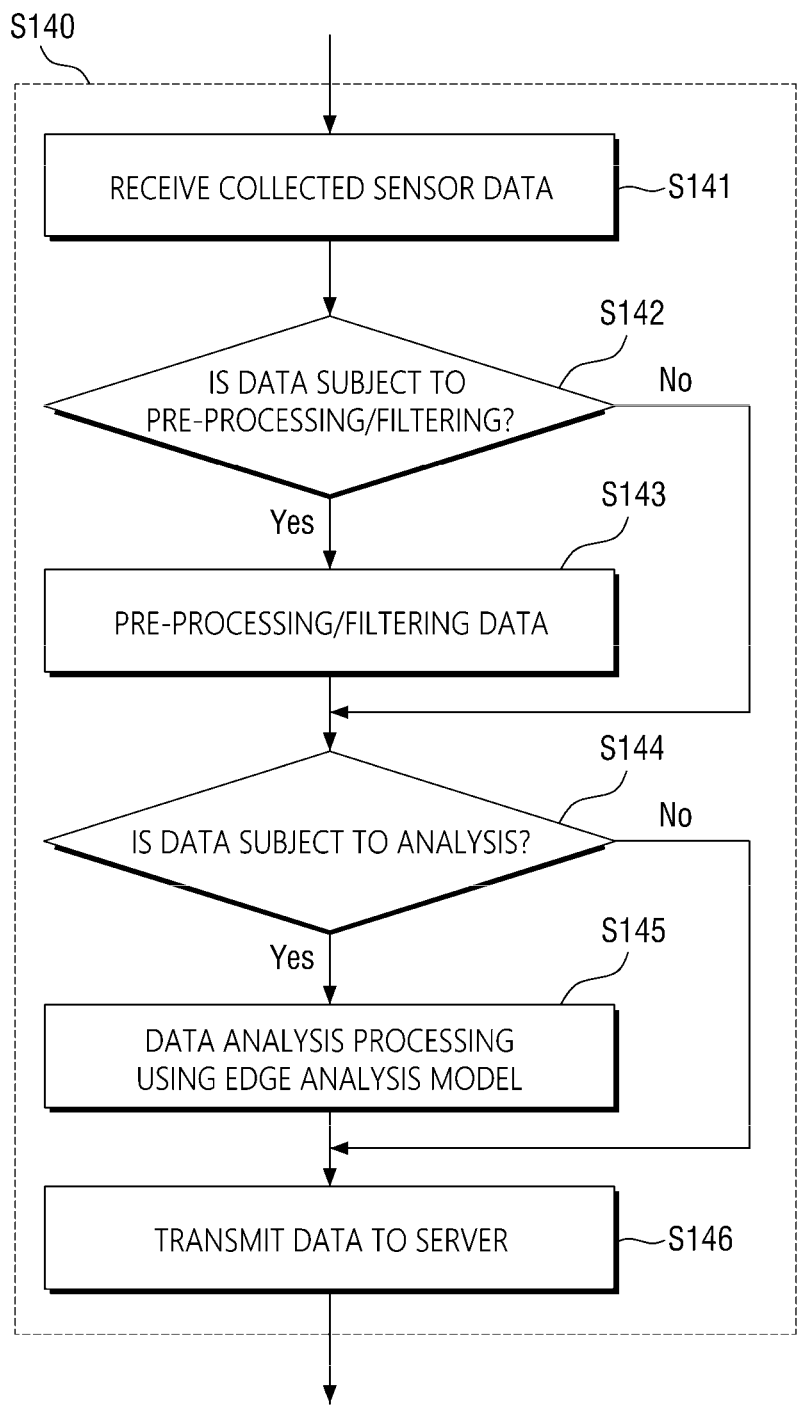
FIG. 11 is a flowchart illustrating a specific embodiment of step S140 of processing data using an edge module shown in FIG. 3.
Figure 12:
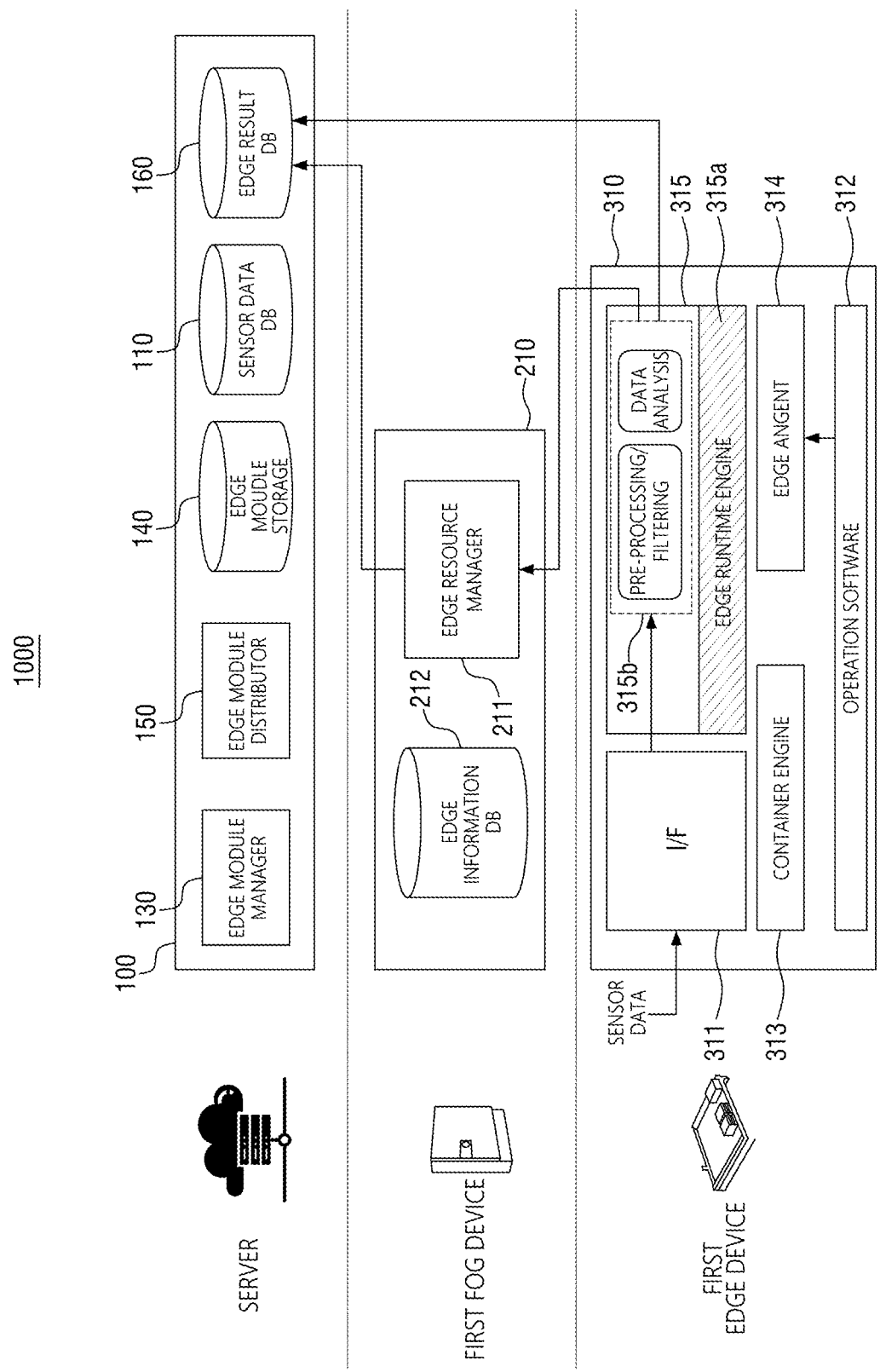
FIG. 12 is a diagram illustrating a specific embodiment of processing data using an edge module described with reference to FIG. 11.

Referring back to 3, at step S140, the edge computing system 1000 processes the data received from the sensor using the arranged edge module. Hereinafter, for detailed description, it will be described with reference to FIGS. 11 and 12. FIG. 11 is a flowchart illustrating an embodiment, in which step S140 of processing data using the edge module illustrated in FIG. 3 is embodied. FIG. 12 is a diagram for illustrating a specific embodiment of data processing using an edge module described with reference to FIG. 11.

Referring to the drawings, at step S141, the first edge device 310 collects sensor data through the interface 311, and the edge module 315b receives the collected sensor data from the interface 311.

At step S142, the edge module 315b of the first edge device 310 determines whether the received sensor data is subject to pre-processing or filtering. If the data is subject to pre-processing or filtering, the present embodiment proceeds to step S143 for related processing. At step S143, the edge module 315b of the first edge device 310 performs pre-processing or filtering on the received sensor data. On the other hand, if the data is not subject to pre-processing or filtering, the embodiment skips step S143 and proceeds directly to step S144.

At step S144, the edge module 315b of the first edge device 310 determines whether the pre-processed or filtered data (or data provided by skipping step S143) is subject to analysis. If the data is subject to analysis, the embodiment proceeds to step S145 for the related analysis processing. If the data is not subject to analysis, the present embodiment skips step S145 and proceeds directly to step S146.

At step S145, the edge module 315b of the first edge device 310 performs data analysis processing using the edge analysis model of the edge module 315b for the provided data. As an embodiment, when the distributed edge module 315b is a module including the abnormality detection analysis model described with reference to FIG. 7, the data analysis processing may be a data analysis processing that detects an abnormality from the provided data. In another embodiment, when the distributed edge module 315b is a module including the failure determination analysis model described with reference to FIG. 7, the data analysis processing may be a data analysis processing for determining whether the provided data has a failure.

At step S146, the first edge device 310 transmits data, on which the analysis processing is completed, (or data provided by skipping step S145 above) to the server 100. As an embodiment, at this time, the first edge device 310 may determine whether there is an upper fog device, similar to FIG. 5, and change the path for transmitting data accordingly. For example, when an upper fog device of the first edge device 310 exists, the first edge device 310 transmits data to the upper fog device 210. In this case, the upper fog device 210 transmits it to the server 100 again, and the upper fog device 210 stores the received data in its edge information DB 212 and then transmits the data stored in the edge information DB 212 to the server 100 in a batch according to a predetermined period. On the other hand, when an upper fog device does not exist, the first edge device 310 connects to the server 100 and transmits data directly to the server. Meanwhile, the data transmitted to the server 100 may be stored in the edge result DB 160 in the server 100. As an embodiment, the server 100 may configure the edge module storage 140, the sensor data DB 110 and the edge result DB 160 so that the edge module storage 140, the sensor data DB 110 and the edge result DB 160 is included in one storage.

Figure 13:
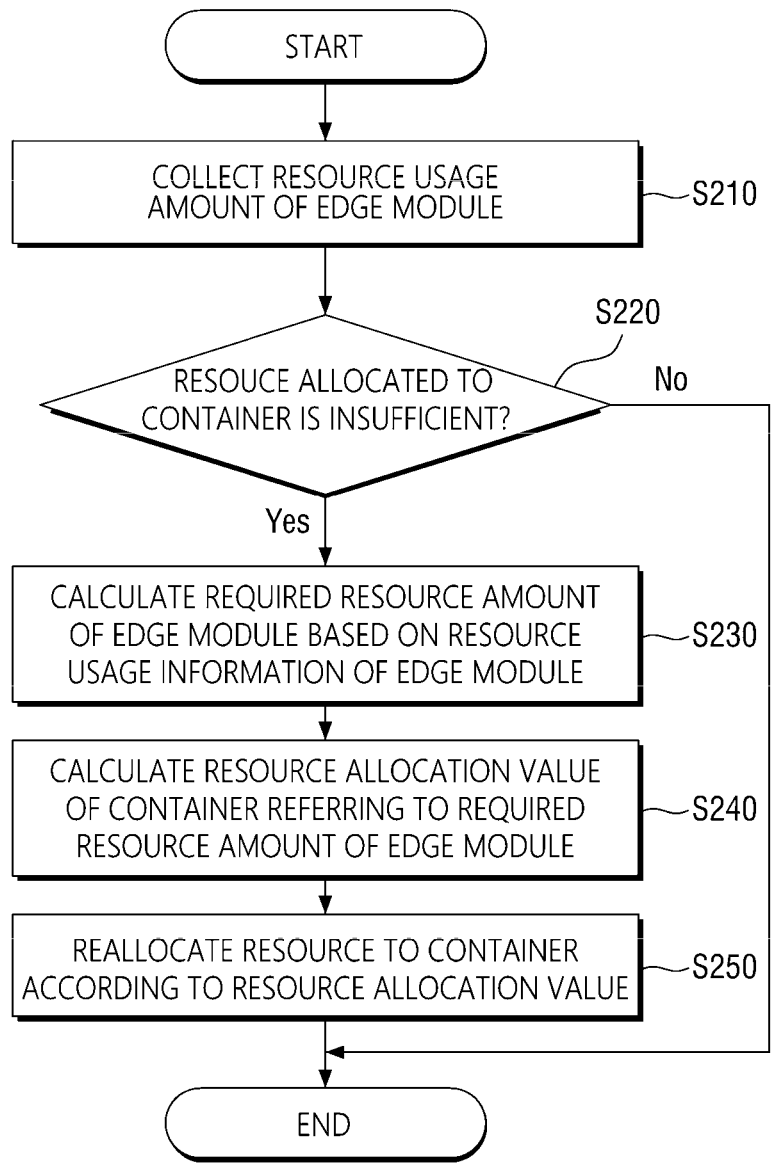
FIG. 13 is a flowchart illustrating an edge computing method of flexibly reallocating container resources in an edge device according to some other embodiments of the present disclosure.

FIG. 13 is a flowchart illustrating an edge computing method of flexibly reallocating container resources in an edge device according to some other embodiments of the present disclosure. In the present embodiment, an example of reallocating container resources in response to a container resource shortage or the like after the edge module is distributed to the edge device will be described. Referring to FIG. 13, the edge computing method according to the present embodiment includes five steps of steps S210 to S250.

At step S210, the edge computing system 1000 collects resource usage of the edge module.

At step S220, the edge computing system 1000 determines whether the resources allocated to the container are insufficient based on the collected resource usage of the edge modules. If there is no shortage of resources allocated to the container, since there is no big problem in the current state, this embodiment does not proceed anymore and terminates as it is. On the other hand, if it is determined that the resources allocated to the container is insufficient, the embodiment proceeds to step S230 to reassign appropriate resources to the container.

At step S230, the edge computing system 1000 calculates a required resource amount of the edge module based on the resource usage information of the edge module. To this end, the edge computing system 1000 may provide the collected resource usage information of the edge module to the server 100 through the first fog device 210, and the server 100 may calculate the expected required resource amount of the edge module according to the provided resource usage information. In this case, the required resource amount calculation may be performed by the resource amount calculator 131 of the edge module manager 130 described with reference to FIG. 10.

As an embodiment, the server 100 may collect process plan information for calculating the required resource amount, calculate an expected usage amount or an expected calculation amount of an edge module according to the process plan, and then calculate the required resource amount based on the usage amount information of the edge module, the process plan information, the expected usage amount or the expected calculation amount, or the characteristics of the edge module.

As an embodiment, the server 100 may collect process plan information for calculating the required resource amount, calculate an expected usage amount or an expected calculation amount of an edge module according to the process plan, calculate a model for predicting the optimal resource amount of the edge module based on the usage amount information of the edge module, the process plan information, the expected usage amount or the expected calculation amount, or the characteristics of the edge module, and provide the model to the first fog device 210 to calculate the required resource amount of the edge module.

At step S240, the edge computing system 1000 calculates a resource allocation value of the container, in which the edge module will be arranged, by referring to the calculated required resource amount of the edge module. As an embodiment, the resource allocation value calculation of the container may be performed by the first fog device 210. In this case, the resource allocation value may be a value indicating a CPU allocation amount or a memory allocation amount to be allocated to the container. The calculated resource allocation value is provided to the first edge device 310.

At step S250, the edge agent 314 of the first edge device 310 provides the provided resource allocation value to the edge runtime engine 315a to reassign the computing resource to the container according to the resource allocation value (or delete an existing container and generate a new container according to the resource allocation value). The edge agent 314 then rearranges the edge module to the container through the edge runtime engine 315a.

Figure 14:
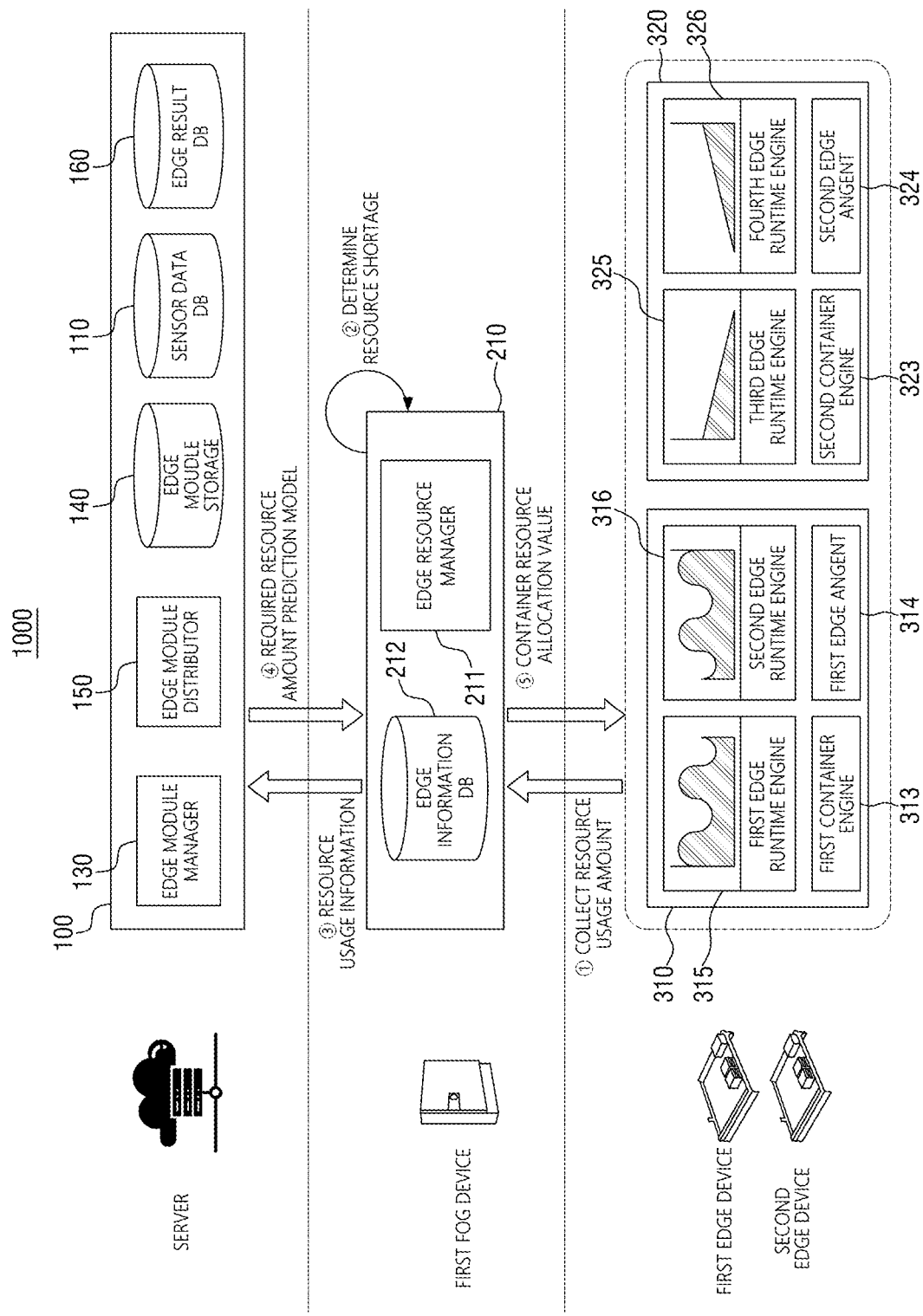
FIG. 14 is a diagram for describing a specific embodiment of a method of flexibly reallocating container resources in an edge device described with reference to FIG. 13.

FIG. 14 is a diagram for describing a specific embodiment of a method of flexibly reallocating container resources in an edge device, described with reference to FIG. 13. Hereinafter, it will be descripted with reference to FIG. 14.

First, the first fog device 210 collects resource usage of edge modules from the edge devices 310 and 320. And, it is determined whether resources allocated to the containers 315, 316, 325 and 326 of the edge devices 310 and 320 are insufficient to drive each edge module by referring to the collected resource usage. If it is determined that the resources allocated to the containers 315, 316, 325 and 326 are insufficient, the first fog device 210 provides resource usage information of the edge modules (e.g., an hourly trend of resource usage amount) to the server 100.

The server 100 receives resource usage information from the first fog device 210 and calculates a required resource amount of the edge modules. In this case, the server 100 may generate a model for predicting the required resource amount of the edge modules instead of directly calculating the required resource amount, and provide the model to the first fog device 210. As an embodiment, as described above, the server 100 may collect process plan information of a manufacturing plant, calculate an expected usage amount or an expected calculation amount of an edge module according to the process plan, and calculate the required resource amount or generate a model for predicting the required resource amount based on the usage amount information of the edge module, the process plan information, the expected usage amount or the expected calculation amount or the characteristics of the edge module. And, the server 100 provides the calculated required resource amount or the required resource amount prediction model to the first fog device 210.

The first fog device 210 calculates a resource allocation value of a container, in which an edge module will be arranged, by using the provided required resource amount or required resource amount prediction model. In this case, the calculated resource allocation value may be a value indicating a CPU allocation amount or a memory allocation amount to be allocated to the container as described above. The calculated resource allocation value is provided to the edge devices 310 and 320.

The edge devices 310 and 320 provide their respective provided resource allocations value to the edge agents 314 and 324, and allocate computing resources to their containers 315, 316, 325 and 326 based on the resource allocation value (or delete an existing container and generate a new container according to the resource allocation value). The edge devices 310 and 320 use the edge agents 314 and 324 to arrange the edge modules in the container, to which resources have been reallocated (or newly generated).

Figure 15:
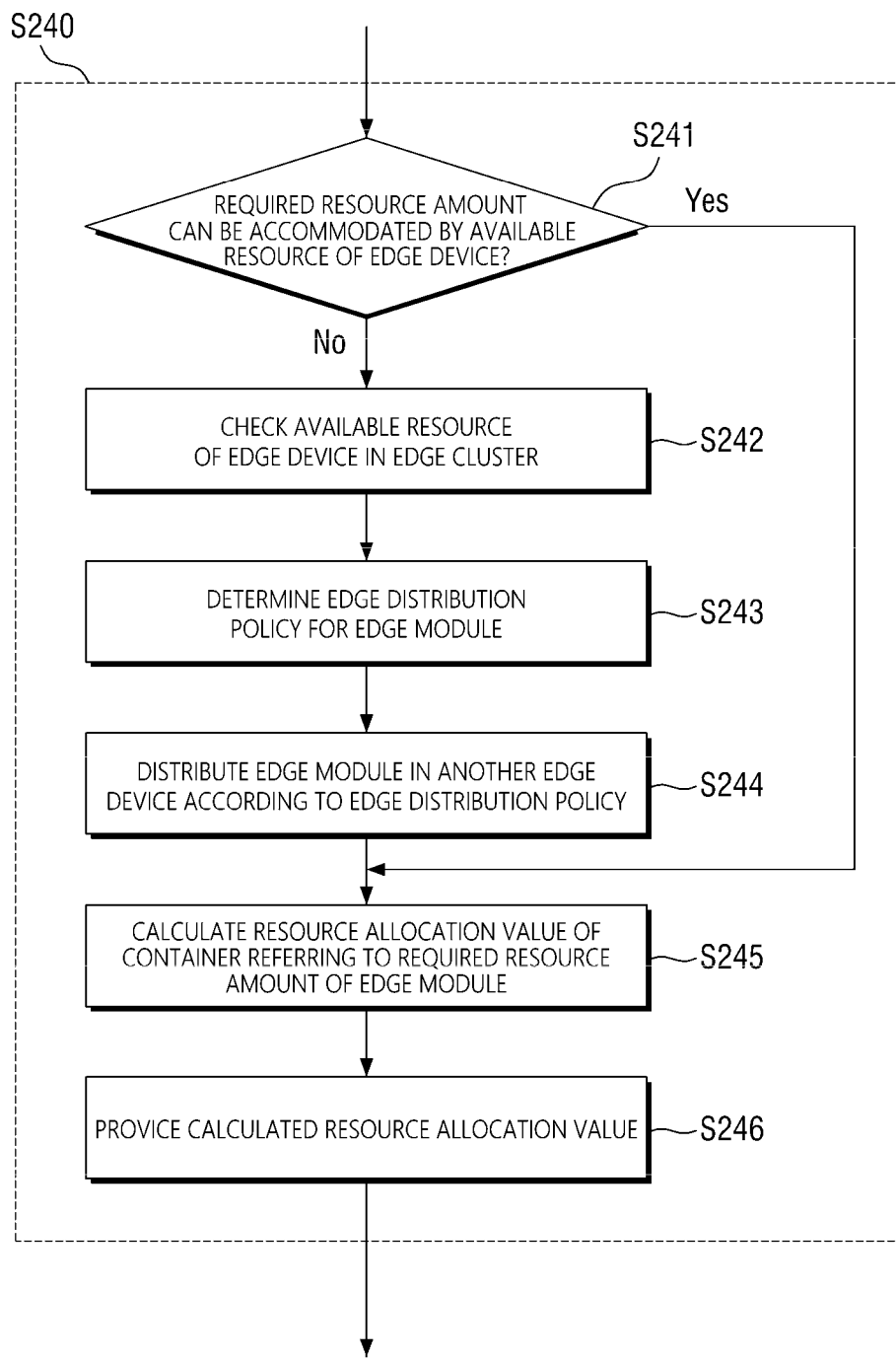
FIG. 15 is a flowchart illustrating a specific embodiment of step S240 of calculating a container resource allocation value of FIG. 13.

FIG. 15 is a flowchart illustrating a specific embodiment of step S240 of calculating a resource allocation value of a container of FIG. 13. Referring to FIG. 15, the resource allocation value calculation step of the container according to the present embodiment includes six steps S241 to S246.

At step S241, the first fog device 210 determines whether the required resource amount of the edge module can be accommodated by available resources of the edge device, in which the edge module is currently arranged. If it can be accommodated, the embodiment proceeds directly to step S245. If it cannot be accommodated, the embodiment proceeds to step S242.

At step S242, the first fog device 210 checks available resources of edge devices in the edge cluster. Here, the edge cluster is a group of tying a plurality of edge devices, for example, a plurality of edge devices managed by the first fog device 210 may be classified into one edge cluster. Information about available resources of the edge devices in the cluster is provided to the server 100.

At step S243, the server 100 determines an edge distribution policy so that the edge module may be distributed to edge devices having available resources in the edge cluster (hereinafter, referred to as 'idle edge device'). The edge distribution policy may include information about which edge module to be distributed to which of the idle edge devices, or a method of configuring a container at that time (for example, whether to configure a container as a single edge device or a crossover container in multiple devices).

At step S244, the server 100 distributes the edge module to another new edge device, to which the original edge module was not distributed according to the edge distribution policy.

At step S245, the server 100 calculates a resource allocation value of the container, in which the edge module is arranged, by referring to the required resource amount of the edge module. As an embodiment, the calculated resource allocation value may be a value indicating a CPU allocation amount or a memory allocation amount to be allocated to the container.

At step S246, the server 100 provides the calculated resource allocation value to the first edge device 310.

Figure 16:
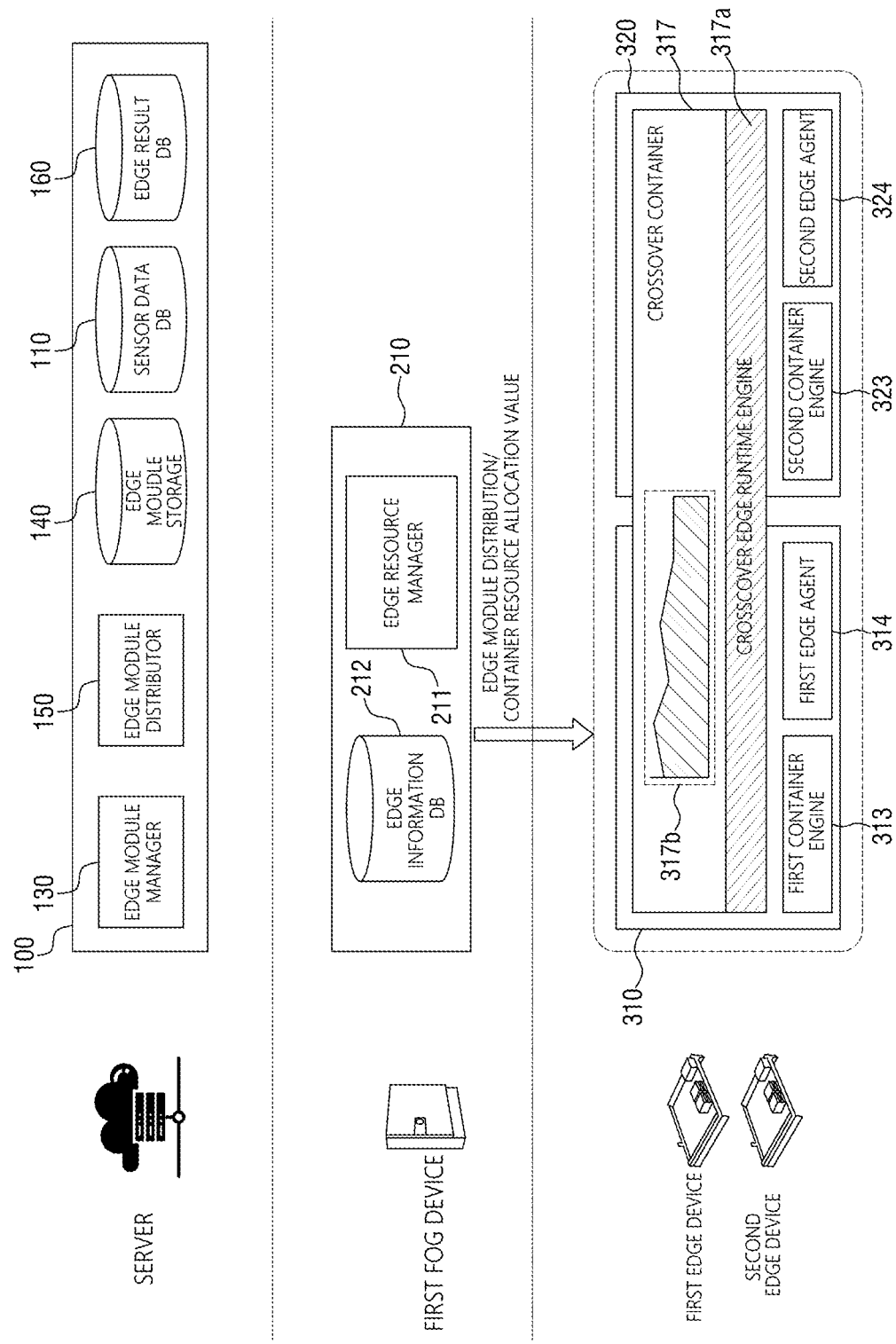
FIG. 16 illustrates a diagram describing a case of an embodiment of FIG. 15, in which a crossover container is configured between a plurality of edge devices and an edge module is driven through this.

FIG. 16 is a diagram for illustrating a case of the embodiment of FIG. 15, in which a crossover container is configured between a plurality of edge devices and the edge module is driven through this. The embodiment of FIG. 16 is similar to the embodiment of FIG. 14. However, the embodiment of FIG. 16 differs in that one crossover container 317 is configured across the plurality of edge devices 310 and 320, and a crossover edge module is arranged in the crossover container 317. As described above with reference to steps S242 to S244 of FIG. 15, when an available resource of an edge device, in which an edge module is currently arranged, cannot accommodate a required resource amount of an edge module, an edge module should be arranged to another edge device having a margin of computing resources. However, in some cases, if only a single edge device cannot accommodate the required resource amount of the edge module (that is, no edge device can be found that can alone accommodate the required resource amount of the edge module), one container can be configured by associating a plurality of edge devices and integrating their available resources (hereinafter referred to as a "crossover container").

Referring to FIG. 16, an embodiment that one crossover container 317 is configured by associating the first edge device 310 and the second edge device 320, and one edge module 317b is arranged in the crossover container 317 is illustrated. In this case, the container engines 313 and 323 and the edge agents 314 and 324 are configured for each of the edge devices 310 and 320, but the edge runtime engine that directly interfaces the container can be configured as one crossover edge runtime engine 317a that crosses the edge devices 310 and 320.

As an embodiment, when configuring the crossover container 317, each edge agent 314 and 324 may configure a proxy for interworking.

Hereinafter, an exemplary computing device 2000 that may implement a device according to various embodiments of the present disclosure will be described with reference to FIG. 17.

Figure 17:
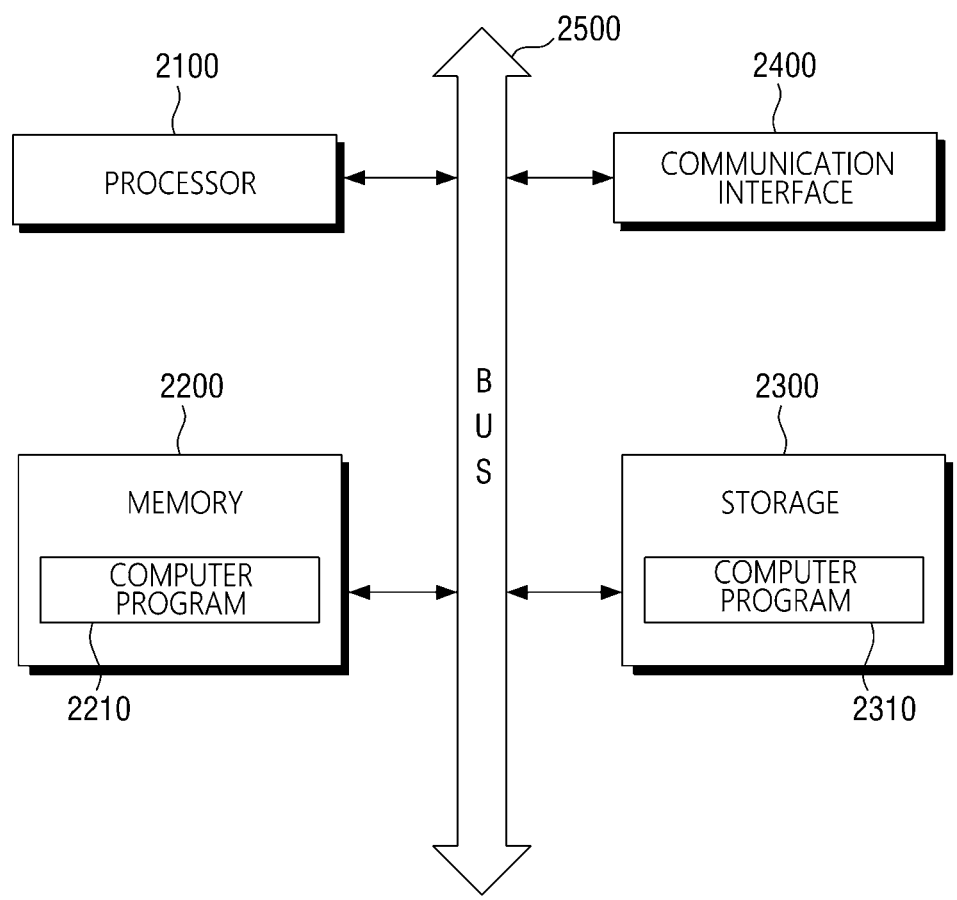
FIG. 17 is a block diagram illustrating an example computing device 2000 that may implement a user interface object detection system according to various embodiments of the present disclosure.

FIG. 17 is a hardware configuration diagram illustrating the computing device 2000. As shown in FIG. 15, the computing device 2000 may include one or more processors 2100, a memory 2200 for loading a computer program executed by the processor 2100, a bus 2500, a communication interface 2400 and the storage 2300 for storing the computer program 2310. However, FIG. 17 illustrates only the components related to the embodiments of the present disclosure. Accordingly, it will be appreciated by those skilled in the art that the present disclosure may further include other general purpose components in addition to the components illustrated in FIG. 17.

The processor 2100 controls the overall operation of each component of the computing device 2000. The processor 3100 may be configured to include a central processing unit (CPU), a micro processor unit (MPU), a micro controller unit (MCU), a graphics processing unit (GPU), or any type of processor well known in the art. Further, the processor 2100 may perform a calculation on at least one application or program for executing a method/operation according to the embodiments of the present disclosure. Computing device 2000 may have one or more processors.

The memory 2200 stores various data, commands, and/or information. The memory 2200 may load one or more programs 2310 from the storage 2300 to execute a method/operation according to various embodiments of the present disclosure. The memory 2200 may be implemented as a volatile memory such as a RAM, but the technical scope of the present disclosure is not limited thereto.

The bus 2500 provides communication between components of the computing device 2000. The bus 2500 may be implemented as various types of buses such as an address bus, a data bus, and a control bus.

The communication interface 2400 supports wired and wireless Internet communication of the computing device 2000. Further, the communication interface 2400 may support various communication methods other than Internet communication. To this end, the communication interface 2400 may comprise a communication module well known in the art of the present disclosure. In some cases, the communication interface 2400 may be omitted.

The storage 2300 may non-temporarily store one or more computer programs 2310 and various data. The storage 2300 may be configured to include a nor volatile memory such as a read only memory (ROM), erasable programmable ROM (EPROM), electrically erasable programmable ROM (EEPROM), flash memory, or the like, a hard disk, a removable disk, or any known type of computer readable recording medium well known in a technical field, to which the present disclosure belongs.

Computer program 2310 may include one or more instructions that, when loaded into memory 2200, cause processor 2100 to perform methods/operations in accordance with various embodiments of the present disclosure. That is, the processor 2100 may perform the methods/operations according to various embodiments of the present disclosure by executing the one or more instructions.

For example, when the computing device 2000 is the server 100 of FIG. 1, the computer program 2310 may include instructions for analyzing the transmitted sensor data, generating an edge analysis model using machine learning, generating an edge module based on the edge analysis model and storing the generated edge module in an edge module storage, described with reference to FIG. 6.

Alternatively, when the computing device 2000 is the server 100 of FIG. 1, the computer program 2310 may include instruction for inquiring the information of the edge module and the edge devices, determining an edge device, to which the edge module is distributed, and determining a resource allocation value of a container, in which the edge module will be executed, as described with reference to FIG. 8.

As another example, when the computing device 2000 is the edge device 310, 320, 330 or 340 of FIG. 1, the computer program 2310 may include instructions for connecting the edge module distributor of the server and the edge agent of the edge device, receiving an edge module and a container resource allocation value, generating a container based on the container resource allocation value, and arranging an edge module in the generated container, as described with reference to FIG. 9.

Alternatively, when the computing device 2000 is the edge device 310, 320, 330 or 340 of FIG. 1, the computer program 2310 may include instructions for receiving data collected from the sensor, determining whether data is subject to pre-processing or filtering, preprocessing or filtering data, determining whether the data is subject to analysis, analysis processing data using an edge analysis model, and transmitting the processed data to a server.

As another example, when the computing device 2000 is the fog device 210 or 220 of FIG. 1, the computer program 2310 may include instructions for collecting resource usage of the edge module, determining whether there is a shortage in resources allocated to the container, calculating a required resource amount of the edge module based on resource usage information of the edge module, and calculating a resource allocation value of the container with reference to the required resource amount of the edge module, as described with reference to FIG. 13.

Alternatively, when the computing device 2000 is the fog device 210 or 220 of FIG. 1, the computer program 2310 may include instructions for determining whether a required resource amount of the edge module can be accommodated by an available resource of the edge device, calculating a resource allocation value of the container with reference to the required resource amount of the edge module and providing the calculated resource allocation value to the edge device.

Until now, various embodiments of the present disclosure and effects of the embodiments have been described reference to FIGS. 1 through 17. However, the effects of the technical spirit of the present disclosure are not restricted to the one set forth herein. The above and other effects of the embodiments will become more apparent to one of daily skill in the art to which the embodiments pertain by referencing the claims.

The technical spirit of the present disclosure described above with reference to FIGS. 1 through 17 can be implemented in computer-readable code on a computer-readable medium. The computer-readable recording medium may be, for example, a removable recording medium (a compact disc (CD), a digital versatile disc (DVD), a Blu-ray disc, a universal serial bus (USB) storage device or a portable hard disk) or a fixed recording medium (a ROM, a RAM or a computer-equipped hard disk). The computer program recorded on the computer-readable recording medium may be transmitted to another computing device via a network such as the Internet and installed in the computing device, and thus can be used in the computing device.

Although it has been mentioned that all components configuring the embodiments of the present disclosure described hereinabove are combined with each other as one component or are combined and operated with each other as one component, the present disclosure is not necessarily limited to the above-mentioned embodiments. That is, all the components may also be selectively combined and operated with each other as one or more components without departing from the scope of the present disclosure.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims. The exemplary embodiments should be considered in a descriptive sense only and not for purposes of limitation. Therefore, the scope of the present disclosure is defined not by the detailed description of the present disclosure but by the following claims, and all differences within the scope will be construed as being included in the present disclosure.

What is claimed is:

1. An edge computing method for flexibly allocating a computing resource, the method comprising:
   receiving an edge module and a container resource allocation value;
   generating a container based on the container resource allocation value; and
   arranging the edge module in the generated container,
   wherein the edge module is a module distributed to an edge computing device and configured to perform a predetermined data processing operation;
   the container is a software component of the edge computing device that provides an isolated computing environment for driving the edge module; and
   the edge computing device is a computing device installed on-premise;
   the edge computing device includes another container different from the container;
   the another container is arranged with another edge module different from the edge module; and
   the edge module and the another edge module have a complementary time-resource usage graph.

2. The edge computing method of claim 1, wherein the edge module is provided from a server in communication with the edge computing device directly or via another device; and
   the server generates the edge module through a machine learning based artificial intelligence model trained using data provided from the edge computing device.

3. The edge computing method of claim 2, wherein the server distributes the edge module to the edge computing device based on a result of monitoring the edge module and the edge computing device.

4. The edge computing method of claim 1, further comprising:
pre-processing or filtering data collected by the edge computing device using the edge module arranged in the container; and
performing data analysis processing on the pre-processed or filtered data using an edge analysis module of the edge module.

5. The edge computing method of claim 1, wherein the container resource allocation value is provided from a server in communication with the edge computing device directly or via another device; and
the server, after calculating an expected required resource amount of the edge module, determines the container resource allocation value according to the calculated expected required resource amount.

6. The edge computing method of claim 1, wherein the container resource allocation value is provided from a server in communication with the edge computing device directly or via another device;
the server generates and provides a model for predicting an expected required resource amount of the edge module; and
the container resource allocation value is calculated based on the model for predicting the expected required resource amount.

7. The edge computing method of claim 1, wherein the container resource allocation value includes a value indicating a CPU allocation value or a memory allocation value to be allocated to the container.

8. An edge computing method for flexibly allocating a computing resource comprising:
collecting resource usage of an edge module;
determining whether a resource allocated to a container, in which the edge module is arranged, is insufficient by referring to the resource usage of the edge module;
calculating a required resource amount of the edge module by referring to the resource usage of the edge module according to the determination result; and
calculating a resource allocation value of the container based on the required resource amount of the edge module,
wherein the edge module is a module distributed to an edge computing device and configured to perform a predetermined data processing operation;
the container is a software component of the edge computing device that provides an isolated computing environment for driving the edge module; and
the edge computing device is a computing device installed on-premise;
wherein the calculating of the resource allocation value of the container comprises:
identifying an available resource of edge computing devices in an edge cluster including the edge computing device; and
determining an edge distribution policy for the edge module based on a result of identifying the available resource.

9. The edge computing method of claim 8, wherein the edge computing device re-assigns a resource to the container according to the calculated resource allocation value.

10. The edge computing method of claim 8, wherein calculating a resource allocation value of the container comprises:
determining whether the required resource amount of the edge module can be accommodated by an available resource of the edge computing device.

11. The edge computing method of claim 10, further comprising,
reallocating a resource to a container according to the resource allocation value of the container, wherein the resource reallocated container is a crossover container configured by integrating an available resource of a plurality of edge computing devices in the edge cluster.

12. An edge computing system for flexibly allocating a computing resource, comprising:
a processor;
a memory for loading a computer program executed by the processor; and
a storage for storing the computer program,
wherein the computer program includes instructions to perform operations comprising:
receiving an edge module and a container resource allocation value;
generating a container based on the container resource allocation value; and
arranging the edge module in the generated container;
the edge module is a module distributed to an edge computing device and configured to perform a predetermined data processing operation;
the container is a software component of the edge computing device that provides an isolated computing environment for driving the edge module; and
the edge computing device is a computing device installed on-premise;
the edge computing device includes another container different from the container;
the another container is arranged with another edge module different from the edge module; and
the edge module and the another edge module have a complementary time-resource usage graph.

* * * * *